US008660040B1

United States Patent
Edholm

(10) Patent No.: US 8,660,040 B1
(45) Date of Patent: Feb. 25, 2014

(54) BIFURCATED CONFERENCING FUNCTIONS

(75) Inventor: Philip Edholm, Pleasanton, CA (US)

(73) Assignee: Rockstar Consortium US LP, Plano, TX (US)

( * ) Notice: Subject to any disclaimer, the term of this patent is extended or adjusted under 35 U.S.C. 154(b) by 1900 days.

(21) Appl. No.: 11/616,701

(22) Filed: Dec. 27, 2006

(51) Int. Cl.
  *H04L 12/16* (2006.01)
  *H04Q 11/00* (2006.01)

(52) U.S. Cl.
  USPC .......................... 370/262; 370/260; 370/261

(58) Field of Classification Search
  None
  See application file for complete search history.

(56) References Cited

U.S. PATENT DOCUMENTS

| | | | |
|---|---|---|---|
| 2002/0123895 A1* | 9/2002 | Potekhin et al. | 704/275 |
| 2005/0078171 A1* | 4/2005 | Firestone et al. | 348/14.08 |
| 2006/0026002 A1* | 2/2006 | Potekhin et al. | 704/275 |
| 2007/0153712 A1* | 7/2007 | Fry et al. | 370/263 |
| 2007/0156924 A1* | 7/2007 | Ramalingam et al. | 709/246 |
| 2007/0286101 A1* | 12/2007 | Gagne et al. | 370/260 |
| 2007/0299981 A1* | 12/2007 | Baird | 709/231 |

* cited by examiner

*Primary Examiner* — Jae Y Lee
(74) *Attorney, Agent, or Firm* — Withrow & Terranova, PLLC

(57) ABSTRACT

A source conference function is provided for each source device, and a destination conference function is provided for each destination device. Any given user terminal may act as both a destination device when receiving media content and a source device when sending media content to facilitate bidirectional conferencing. The source device generates media content, which is sent to the associated source conference function. In general, the source conference function identifies destination conference functions to which the media content should be delivered, and delivers the media content to the identified destination conference functions. Any given destination conference function receives the media content from this and other source conference functions. The media content received from all or select of the source conference functions may be processed by the destination conference function as desired, and then mixed together to form destination media content, which is delivered to the destination device.

27 Claims, 12 Drawing Sheets

| DESTINATION CONFERENCE TABLE | | PARTICIPANT E (L0) | |
|---|---|---|---|
| SOURCE CONF. FUNCTION | PRIORITY INFORMATION | ORIENTATION INFORMATION | SUPP. MEDIA INFORMATION |
| A | 10 | LOC: L1 (NW 0 dB) | LOW BACKGROUND EXPLOSIONS |
| B | 4 | LOC: L2 (SW -3 dB) | LOUD EXPLOSIONS |
| C | 4 | LOC: L3 (SE -6 dB) | LOUD EXPLOSIONS |
| D | 8 | LOC: L4 (E -10 dB) | JUNGLE SOUNDS MED. EXPLOSIONS |

*FIG. 10* even though other participants are contending for conference access. Generally, the other participants have little control over the conference itself, and have little or no influence on prioritizing themselves or others in gaining conference control.

BIFURCATED CONFERENCING FUNCTIONS

FIELD OF THE INVENTION

The present invention relates to media conferencing, and in particular to bifurcating conferencing functionality into source and destination conference functions that are associated with conference participants.

BACKGROUND OF THE INVENTION

Conference bridges are used to facilitate conference calls between two or more conference participants. In operation, multiple calls from multiple communication terminals are terminated at a conference bridge. In simpler conference bridges, the audio signals from each of the communication terminals are mixed together and provided back to each of the communication terminals. In more advanced conference bridges, the audio levels for the audio signals from the different communication devices are monitored and used to identify one or more of the audio signals to provide as an output to the communication devices. In general, the communication terminal or terminals providing the audio signals having the highest level at any given time are selected as the selected communication terminal. The audio signals from the selected communication terminals are mixed together and delivered all of the communication terminals in the conference. The audio signals from the unselected communication terminals are dropped, and thus, are not provided to the communication terminals. As such, only the audio signals provided by the selected communication terminals are presented to the communication terminals in the conference. At any given time, none of the participants will hear any participants other than those using the selected communication terminals. To avoid distractions, the audio signal from a selected communication terminal is generally not provided back to itself.

Since conference bridges generally select the audio signals from the loudest participant to present to other participants, there are many situations where other participants are contending for conference time to no avail. If those participants contending for conference time do not present audio signals at a level higher than the participant using the currently selected communication terminal, they will never be selected as the selected participant. This situation is problematic for soft-spoken participants as well as participants in a conference with a relatively active and loud participant. In many instances, a louder participant may gain conference access and maintain conference access for extended periods of time, even though other participants are contending for conference access. Generally, the other participants have little control over the conference itself, and have little or no influence on prioritizing themselves or others in gaining conference control.

Further, conference calls are being employed in more diverse applications. For instance, on-line gaming groups are employing conference calls to allow multiple gamers from different locations to talk with each other during a gaming session. Given the excitement and potential for significant background music or other noise, those gamers with the louder group or environment may dominate the conference simply due to the selection process used by the conference bridge hosting the conference call. Again, participants have little control over their conference experience and the louder participants may gain conference access and maintain conferences access for extended periods of time, even though other participants may want or need conference access.

Further, audio conferencing for these gaming environments are often unrealistic relative to the virtual environment of the game. Within a game environment, there are few scenarios where all of the participants should be able to communicate with each other all of the time. Ideally, there would be multiple conferences for participants on individual team and yet another conference for all of the participants, regardless of team affiliation. However, existing conference bridges are unable to support multiple conferences for a participant or group of participants at the same time. Further, the centralized nature of conference bridges makes integrating the gaming controller with the conference bridge practically impossible. Thus, the sounds of the game are generally separated from the sounds of the participants.

Gaming environments as well as traditional conference environments are supporting more and more participants in a given conference. As the number of participants grows, network resources are being taxed. The centralized nature of the conference bridges limits the scalability of the conferencing. To increase the number of participants a conference bridge can support, additional ports and processing resources are added to the existing conference bridge, or a new conference bridge is added.

Accordingly, there is a need for a scalable conferencing mechanism that imparts greater conference control to the individual participants. There is a further need for a conferencing mechanism to support multiple conferences for a given participant or group of participants as well as provide a platform that can be integrated with other systems, such as gaming systems.

SUMMARY OF THE INVENTION

The present invention bifurcates traditional media conferencing functionality into source and destination conference functions to create a flexible and readily scalable media conferencing environment. Bifurcating media conferencing in this manner can conserve network resources as well as support applications that were previously impracticable or impossible. A source conference function is provided for each source device, and a destination conference function is provided for each destination device. Any given user terminal may act as both a destination device when receiving media content and a source device when sending media content to facilitate bidirectional conferencing. The source device generates media content, which is sent to the associated source conference function. In general, the source conference function identifies destination conference functions to which the media content should be delivered, and delivers the media content to the identified destination conference functions. Any given destination conference function receives the media content from this and other source conference functions. The media content received from all or select of the source conference functions may be processed by the destination conference function as desired, and then mixed together to form destination media content, which is delivered to the destination device.

Media content is generally delivered in media streams. A destination conference function may receive from multiple source conference functions any number of media streams associated with a given conference. The destination conference function may select one or more of the media streams as active media streams based on certain control information. The control information may be provided by any entity or function as well as be derived from the media content itself. For example, the destination conference function may analyze the audio-based media content from the various source conference functions to determine relative volume levels of the respective sources, wherein the media streams associated with the highest volume levels are selected as the active sources. In another example, the control information is related to a priority to associate with a given media stream, or information helpful in determining whether to select the media stream as an active media stream, and how to process the media stream if it is selected as an active media stream. In the latter case, orientation information may be provided as control information to identify a participant's actual or virtual location, direction, or a combination of thereof to aid in selecting active media streams and processing the active media streams. Such orientation information may be absolute or relative to that of other participants.

Various types of control information may be provided to the respective source and destination conference functions to control any given conference. In addition to receiving information from a centralized control system, the source and destination conference functions may provide control information to each other. The control information may be exchanged using in-band or out-of-band signaling. In-band signaling entails providing the control information in the packets of the media stream carrying the media content. Out-of-band signaling entails delivering the control information outside of the media stream carrying the media content, and as such, may be delivered directly or via the centralized control system.

The active media streams that are selected for a given destination conference device may be processed based on the same or different control information and then mixed together to form the destination stream, which carries the destination media content to the destination device. Notably, the destination conference function may support multiple conferences at any given time for the destination device. Media streams associated with different conferences and selected for a given destination device may be mixed together to form the destination stream. The destination media content in the destination stream may have content from different conferences at the same time, such that a participant associated with the destination device is presented a unique blend of media content from the various conferences. Accordingly, each participant may be presented a unique blend of media content from various sources for one or more conferences at any given time.

In certain embodiments, a conference system may support multiple destination conference functions. If a source conference function must send media content for a given source device to multiple destination conference functions that are provided in a given conference system, the media content may be delivered to the multiple destination conference functions using a single, multicast stream. As such, the use of redundant unicast streams between the source conference function and the destination conference functions is avoided.

Those skilled in the art will appreciate the scope of the present invention and realize additional aspects thereof after reading the following detailed description of the preferred embodiments in association with the accompanying drawing figures.

BRIEF DESCRIPTION OF THE DRAWING FIGURES

The accompanying drawing figures incorporated in and forming a part of this specification illustrate several aspects of the invention, and together with the description serve to explain the principles of the invention.

FIG. 10 is an example of a table that may be provided to a destination conference function according to one embodiment of the present invention.

DETAILED DESCRIPTION OF THE PREFERRED EMBODIMENTS

The embodiments set forth below represent the necessary information to enable those skilled in the art to practice the invention and illustrate the best mode of practicing the invention. Upon reading the following description in light of the accompanying drawing figures, those skilled in the art will understand the concepts of the invention and will recognize applications of these concepts not particularly addressed herein. It should be understood that these concepts and applications fall within the scope of the disclosure and the accompanying claims.

Figure 1:
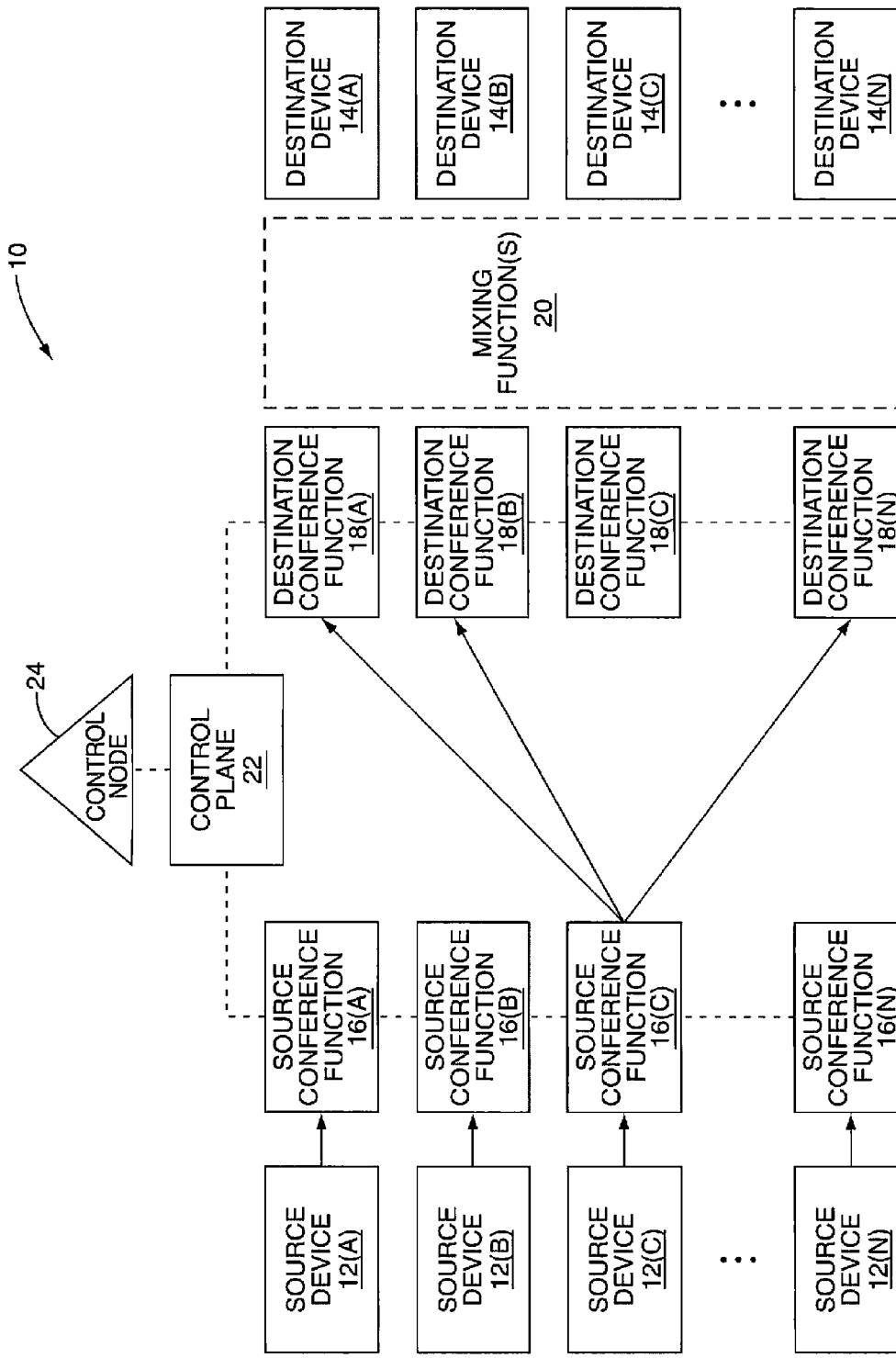
FIG. 1 is a logical representation of a conference environment according to one embodiment of the present invention.

With reference to FIG. 1, a logical representation of a conference environment 10 is provided according to one embodiment of the present invention. In any conference environment, any number of user terminals are able to participate in a conference such that the participants are able to communicate with each other. At any given time, certain user terminals are generating media content that is being presented to other user terminals that are engaged in the conference call. During the course of the conference, each user terminal may be a source for media content as well as a destination for media content, generally depending on whether the associated participant is talking or listening. As such, user terminals may act as a content source or a content destination during the conference. For clarity in the following description, the user terminals are represented as either source devices 12 or destination devices 14, depending on whether they are acting as a content source or a content destination. A source device 12 and a destination device 14 may represent a single user terminal or different user terminals. The source devices 12, destination devices 14, and various other functions are often further referenced with a letter in parenthesis, such as 12(C). These references are used to specifically identify a given entity for particular examples, such as source device 12(C). The user terminals may take any form, such as personal computers, personal digital assistants, mobile telephones, or like communication devices. The communications sessions facilitating the conference functions may extend over wired or wireless circuit-switched or packet networks. As with the associated conferences, the communications sessions may be established as needed or maintained perpetually.

The present invention bifurcates traditional media conferencing functionality into source and destination conference functions to create a flexible and readily scalable conferencing environment 10. Bifurcating media conferencing in this manner can conserve network resources as well as support applications that were previously impracticable or impossible. A source conference function 16 is provided for each source device 12, and a destination conference function 18 is provided for each destination device 14. As noted, any given user terminal may act as both a destination device 14 when receiving media content and a source device 12 when sending media content to facilitate uni-directional or bidirectional conferencing. The source device 12 generates media content, which is sent to the associated source conference function 16. In general, the source conference function 16 identifies destination conference functions 18 to which the media content should be delivered and delivers the media content to the identified destination conference functions 18. Typically, for every user terminal there will be a source conference function 16 and a destination conference function 18. However, this is not necessary in each application as a user terminal may have either a source conference function 16 or a destination conference function 18.

As illustrated in FIG. 1, the media content generated from the source device 12(C) is provided to the source conference function 16(C), which will identify the destination conference functions 18 to which the media content from the source device 12(C) should be sent. Assuming the media content should be sent to destination conference functions 18(A), 18(B), and 18(N), the source conference function 16(C) will deliver the media content to the destination conference functions 18(A), 18(B), and 18(N). These destination conference functions 18 will then process the media content to further conference functionality. Notably, each of the other source conference functions 16(A), 16(B), and 16(N) may be operating in a similar fashion for the same or different conferences, where the respective media content from the corresponding source devices 12(A), 12(B), and 12(N) is sent to the same or different destination conference functions 18.

Figure 2:
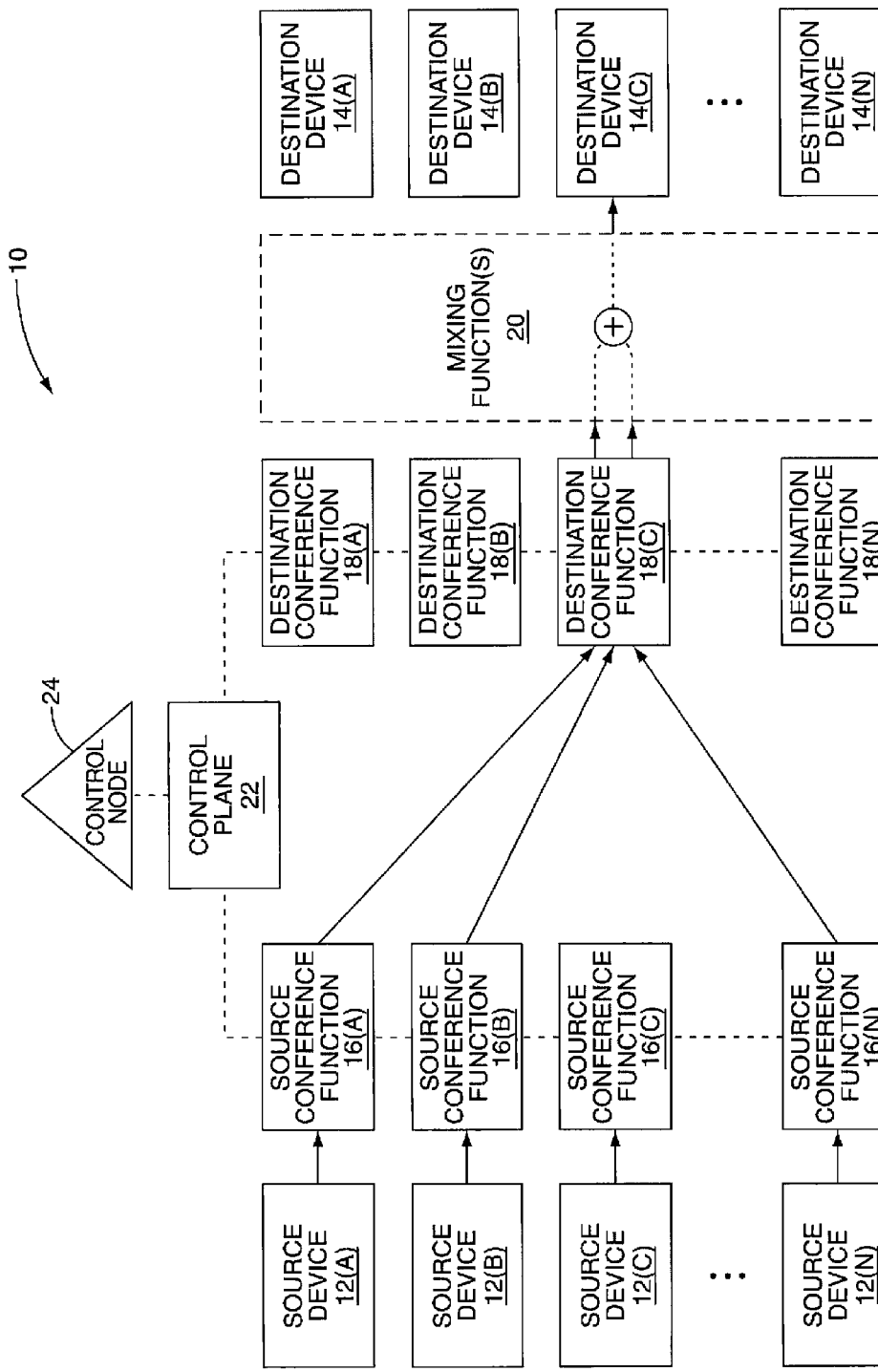
FIG. 2 is an example of a conference facilitated in the conference environment illustrated in FIG. 1 according to one embodiment of the present invention.

As such, any given destination conference function 18 may receive the media content from any number of source conference functions 16 in association with one or more conferences. The media content received from all or select source conference functions 16 may be processed by the destination conference function 18 as desired and then mixed together by a mixing function 20 to form destination media content, which is delivered to an associated destination device 14. As illustrated in FIG. 2, destination conference function 18(C) receives the media content from source conference functions 16(A), 16(B), and 16(N) in association with one or more conferences. The media content received from the source conference functions 16(A), 16(B), and 16(N) may be processed by the destination conference function 18(C) as desired and then mixed together by the mixing function 20 to form destination media content, which is delivered to destination device 14(C).

Media content is generally delivered in media streams. A destination conference function 18 may receive from multiple source conference functions 16 any number of corresponding media streams for a given conference. The destination conference function 18 may select one or more of the media streams as active media streams based on certain control information. The active media streams are then mixed together by the mixing function 20 to generate the destination stream, which is delivered to the corresponding destination device 14. The unselected media streams are left out of the destination stream. Again, the destination stream may be formed from active media streams associated with multiple conferences in which the participant associated with the destination device 14 is participating.

Notably, the term "active" is used only to identify a selected media stream and is not necessarily indicative of the presence or absence of content on selected or unselected media streams. Unselected media streams may have various levels or types of content and may not be selected for various reasons. In other words, the term "active" is not describing the actual media content, but is merely used to indicate which media stream has been selected.

The active media streams that are selected for a given destination device 14 may also be processed based on the control information for the same or different conferences before being mixed together to form the destination stream. Different active streams may be uniquely processed based on unique control information prior to mixing. As such, the destination media content in the destination stream may have content for different conferences at the same time, such that a participant associated with the destination device 14 is presented a unique blend of media content from the various conferences. Those skilled in the art will recognize that actual stream processing and mixing may be implemented in any number of ways, and in particular, may be implemented sequentially or concurrently.

The control information may be provided by any entity or function as well as derived from the media content itself. As illustrated in FIGS. 1 and 2, a logical control plane 22 is provided between the source and destination conference functions 16 and 18. The control plane 22 represents a control path to allow the source and destination conference functions 16 and 18 to receive control information from each other or from another entity or node, such as a control node 24. Although the control plane 22 is shown apart from the media streams that carry the media content, the control plane 22 may be implemented within the media streams, outside of these media streams, or a combination thereof. As such, control information may be derived from the media content or the source and destination conference functions 16, 18 may provide specific control information to each other using in-band or out-of-band signaling. In-band signaling entails providing the control information in the packets of the media stream carrying the media content. Out-of-band signaling entails delivering the control information outside of the media stream carrying the media content, and as such, may be delivered directly or via the control plane 22, as well as by the control node 24.

For example, a destination conference function 18 may analyze audio-based media content received from the various source conference functions 16 to determine relative volume levels of the respective sources, wherein the media streams associated with the highest volume levels are selected as the active media streams. In this instance, the control information is derived from the media content. Alternatively, the source destination function 16 may analyze energy, power, or level characteristics of a media stream from a corresponding source device 12 to systematically identify volume level metrics for the media content. These metrics represent control information, which are systematically inserted as such in all or certain packets of the media stream that is sent to the various destination conference functions 18. The metrics may also be sent in a separate message or in separate signaling in association with the media stream to the destination conference functions 18, which will use the control information accordingly.

In another example, the control information is related to a priority to associate with a given media stream, or other information helpful in determining whether to select the media stream as an active media stream. Again, the control information may also provide instructions for processing the media stream when it is selected as an active media stream. Orientation information may be provided as control information to identify a participant's actual or virtual location, direction, or a combination of thereof to aid in selecting active media streams, processing the active media streams, or both. Such orientation information may be absolute or relative to that of other participants.

In the following flow diagrams, various types of control information are described. Although multiple types of control information are used to illustrate an example of how the invention may be employed, the particular control information for any given embodiment need not be as comprehensive as that provided in the illustrated embodiment. In other words, although multiple types of control information are used in the illustrated embodiment, only a single type of control information is generally necessary to facilitate operation of the present invention. The various types of control information used in the following examples include participant information, source priority information, source orientation information, acoustic properties, destination priority information, destination orientation information, and supplemental media information.

The participant information identifies participants or their associated functions or devices for a given conference. With the present invention, a given participant may participate concurrently in multiple conferences. The source priority information is information accessible by the source conference function 16, and bears on the relative priority that should be provided to the associated participant when determining active media streams. The source priority information may be a relative level metric determined from the media content received from the source device 12, or may be predetermined information that is unrelated to the media content received from the source device 12. The source orientation information may be information bearing on the actual or virtual position of the participant in an actual or virtual conference environment. The position information may bear on actual or relative location, direction, proximity, and the like within the conference environment or with respect to other participants in the conference environment. The supplemental media information may relate to external media to provide in association with the particular media stream or any destination stream in which the media stream is provided. The acoustic properties, as described above, may include the actual or relative level metrics of the actual media content.

The destination priority information is similar to the source priority information, except that it is provided by the destination participant instead of the source participant. Accordingly, the destination participant may assign a relative priority to associate with the source participant with respect to the destination participant, as well as with respect to other source participants. The destination orientation information is similar to the source orientation information, except that it is provided by a function or entity associated with the destination participant. The actual information may relate to the orientation of the source participant, the destination participant, or any other participants in the actual or virtual conference environment. Again, these incarnations of control information are simply provided for the purposes of illustration, and the present invention is not limited thereto.

Figure 3:
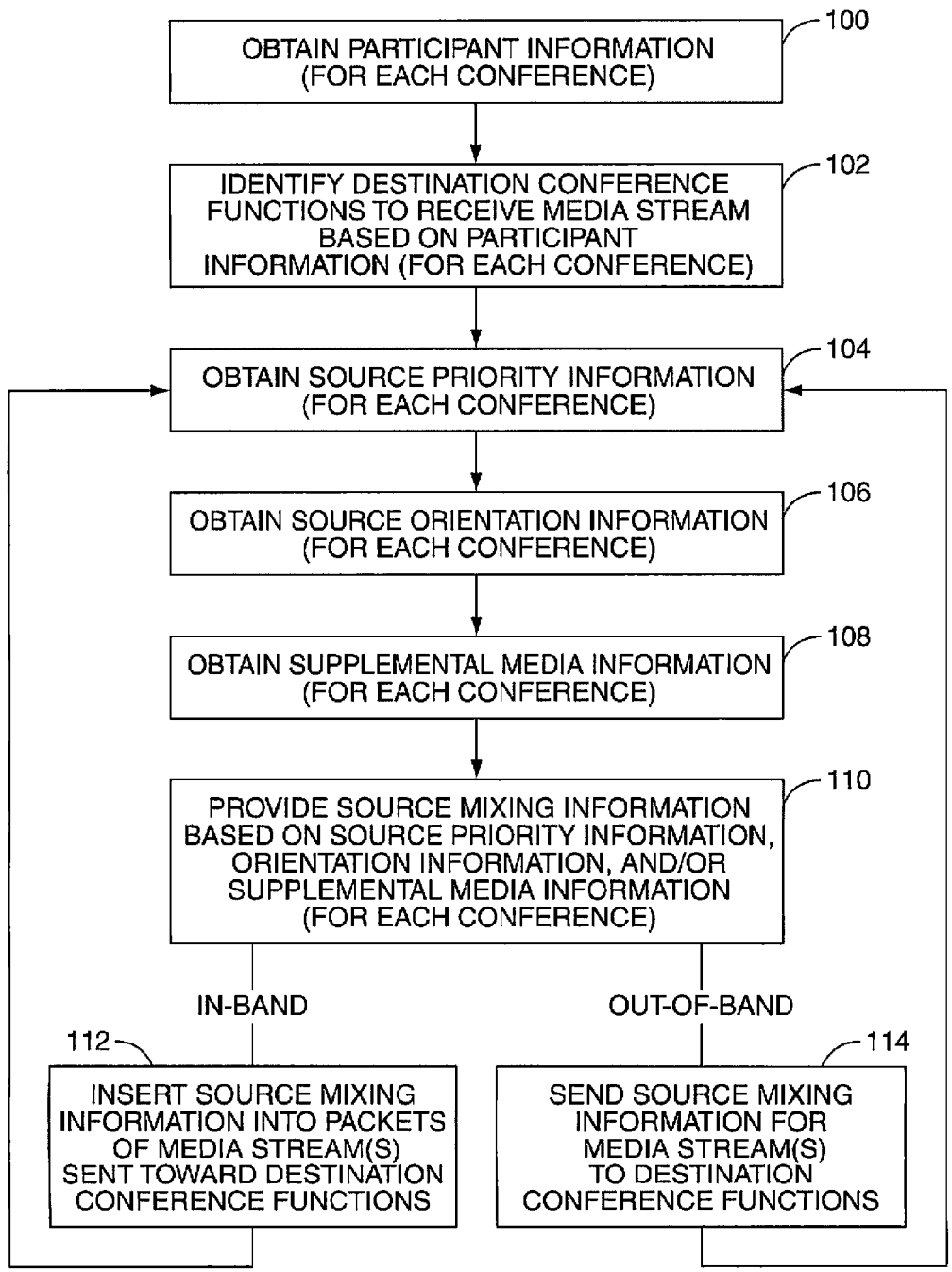
FIG. 3 is a flow diagram illustrating operation of a source conference function according to one embodiment of the present invention.

Turning now to FIG. 3, a flow diagram is provided to illustrate operation of a source conference function 16 according to one embodiment of the present invention. Initially, the source conference function 16 will obtain participant information for any number of conferences in which the participant associated with the source conference function 16 is participating (step 100). The source conference function 16 will then identify the destination conference functions that should receive the media stream of the source device 12 based on the participant information (step 102). Regardless of the number of conferences in which the source participant is participating, the media content from the source participant is sent to all destination conference functions 18 that are associated with participants in one or more conferences.

The source conference function 16 may then obtain source priority information (step 104). The source priority information may be different for each of the concurrent conferences, and may bear on the relative priority that should be applied to the media content from the source participant by the destination conference functions 18 that will receive the media content. Similarly, the source conference function 16 may obtain source orientation information for each conference (step 106). In one example, the source orientation information may identify the location and direction of the source participant in the various conference environments. Again, this information may be absolute or may be relative to other participants in the respective conference environments. Additional control information in the form of supplemental media information may be obtained for each conference (step 108). The supplemental media information may take various forms and may relate to assisting the various destination conference functions 18 in obtaining additional media to present to the destination participant in association with the media content of the source participant. For example, the supplemental media information may include background sounds or music, as well as identify graphics or video clips to present in association with the media content when it is presented to the destination participant in the destination media content.

All or a portion of the control information that is available to the source conference function 16 may need to be delivered to the destination conference functions 18 in association with the media content. As such, the source conference function 16 may provide source mixing information based on the source priority information, orientation information, the supplemental media information, or any combination thereof for delivery to the destination conference functions 18 (step 110). Different source mixing information may be provided for each conference. If the source participant and destination participant are common participants in different conferences, different source mixing information may be sent to the same destination conference function 18 for the different conferences.

As discussed above, the source mixing information may be sent to the appropriate destination conference functions 18 via in-band or out-of-band techniques. For in-band delivery, the source mixing information is inserted into all or certain packets of the media streams that are sent toward the various destination conference functions 18 (step 112). For out-of-band delivery, the source mixing information is sent to the appropriate destination conference functions 18 via messages or signaling outside of the media streams (step 114). This process may take place once for each conference, or systematically throughout the conferences, depending on the type of control information and how the control information is used by the source and destination conference functions 16, 18. If control information is updated throughout the conference, all of the control information may be provided at the beginning of the conference, wherein certain of the conference information is updated throughout the conference and sent to the corresponding destination conference functions 18.

Figure 4:
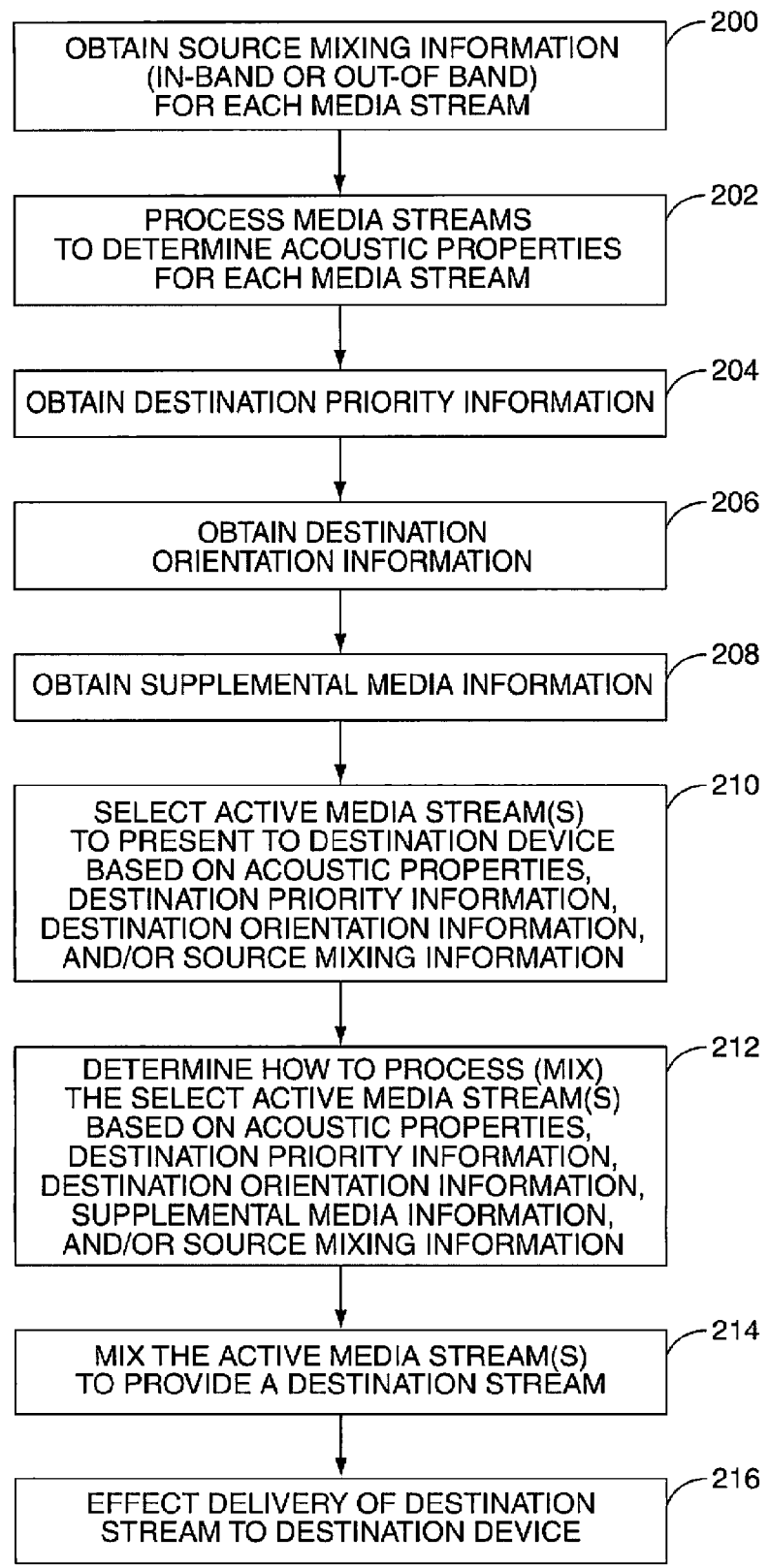
FIG. 4 is a flow diagram illustrating operation of a destination conference function according to one embodiment of the present invention.

Turning now to FIG. 4, operation of a given destination conference function 18 is illustrated according to one embodiment of the present invention. Initially, the destination conference function 18 will obtain any available source mixing information provided in association with incoming media streams (step 200). Again, these media streams may originate from various source conference functions 16 and may be associated with one or more conferences. In this example, assume the destination conference function 18 is configured to process the respective media streams to determine acoustic properties, such as relative level metrics, for each media stream (step 202). The destination conference function 18 may also obtain any accessible destination priority information (step 204), destination orientation information (step 206), and any supplemental media information (step 208). Based on the acoustic properties, destination priority information, destination orientation information, source mixing information, or any combination thereof, the destination conference function 18 will select active media streams to present to the destination device 14 (step 210). The control information obtained from the media content, or source conference functions 16 or other entities, as well as the control information provided at the destination conference function 18 may be the same or different for the respective conferences. However, the destination conference function 18 will take all the various conferences into consideration when determining which media streams to select and use to create the destination stream, which will be sent to the destination device 14.

In addition to merely using this control information to select the active media streams to use to create the destination stream, the selected active media streams may be processed prior to or during mixing in light of the control information. Notably, certain control information may be used to select active media streams, while other control information is used to process the respective media streams. Other control information may bear on both the selection and processing of the media streams. Notably, the present invention does not require that the active media streams be processed prior to or during mixing to create the destination stream.

In addition to media streams from the various source conference functions 16, supplemental media content may be obtained from the destination device 14, the source device 12, or other entity, which may or may not be associated with a participant. For audio-based conferencing, the supplemental media content may include sound effects and the like that are mixed with the selected media streams to create the destination stream.

Continuing with FIG. 4, once the various active media streams from the source conference function 16 and any supplemental media streams are selected and processed, these media streams are mixed together to provide the destination stream (step 214), which is effectively delivered to the corresponding destination device 14 (step 216). This process takes place in a distributed fashion at the various destination conference functions 18 for the various destination devices 14. Accordingly, conference functionality is not only bifurcated, but the bifurcated parts are respectively distributed among the various source and destination devices 12, 14.

Figure 5:
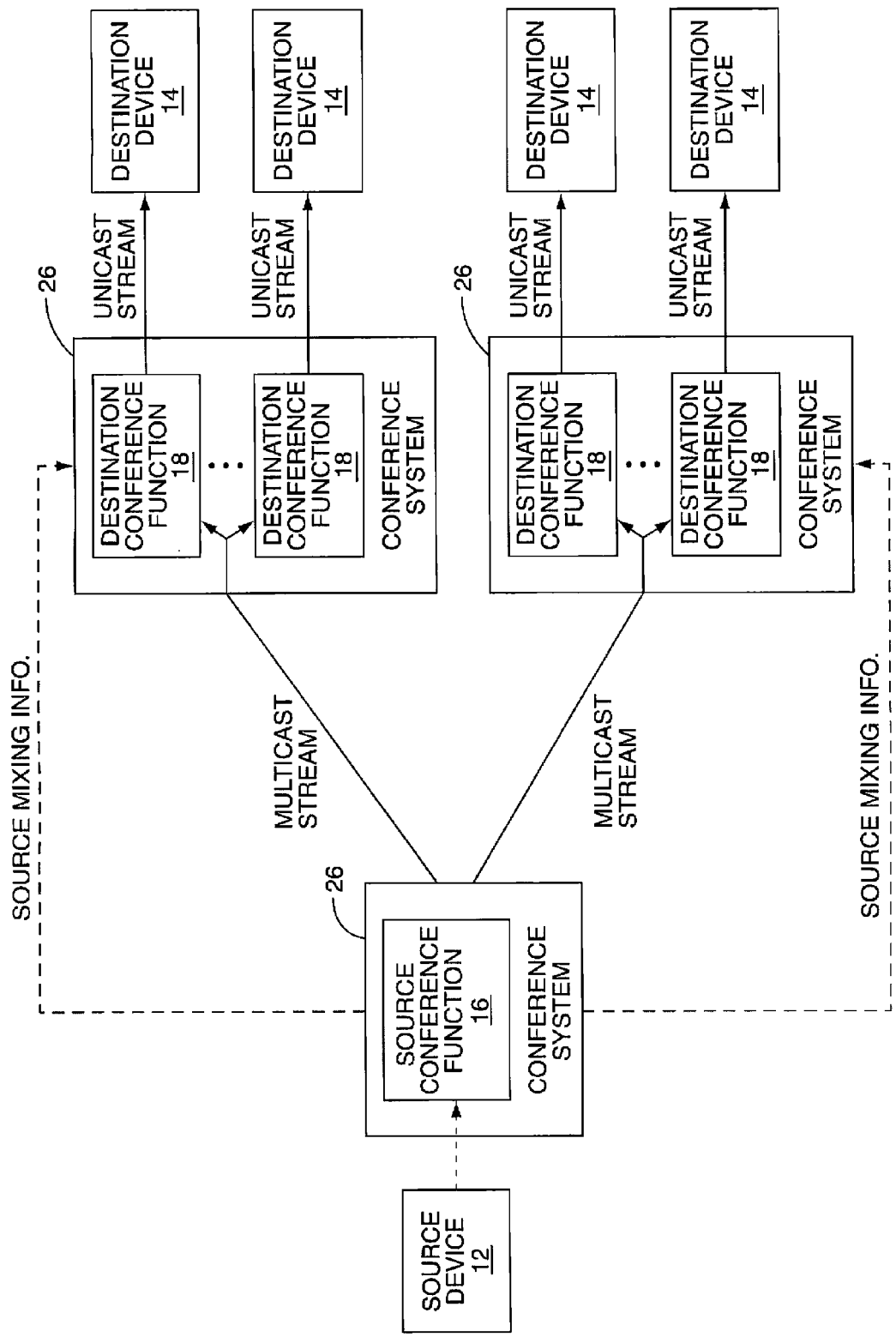
FIG. 5 is a logical representation of various source conference functions and destination conference functions being supported by one or more conference systems according to one embodiment of the present invention.

The various source conference functions 16 and destination conference functions 18 may be supported by one or more conference systems 26, as illustrated in FIG. 5. As such, one or more centralized and network-based conference systems 26 may provide the respective source and destination functions 16, 18 for any number of source and destination devices 12, 14, which generally represent user terminals. When a source conference function 16 needs to send media content to a cluster of destination conference functions 18 that are supported by a given conference system 26, the source conference function 16 may send a single multicast stream including the media content to the conference system 26, which will distribute the media content provided in the multicast stream to the respective destination conference functions 18 that need to receive the media content. As such, only a single media stream is required between the source function 16 and the conference system 26 containing the cluster of destination conference functions 18. The conference system 26 may be arranged wherein the respective destination conference functions 18 may subscribe to or join a multicast stream that is terminated at the conference system 26. The destination stream provided from the destination conference functions 18 to the corresponding destination devices 14 may be a unicast stream. As illustrated, the source mixing information provided by the source conference function 16 represents the control information that is associated with the multicast streams. Although shown separately, the source mixing information is control information that may be provided in-band or out-of-band with respect to the respective multicast streams to control selection and processing of media content. The mixing function 20 is not illustrated in FIG. 5.

Figure 6A:
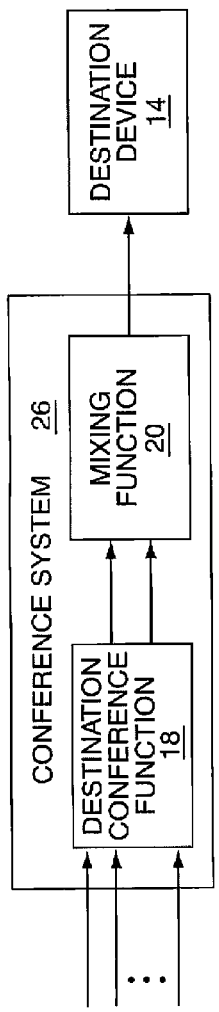
FIGS. 6A-6E are examples of different implementations of source conference functions, destination conference functions, and mixing functions according to several embodiments of the present invention.
Figure 6B:
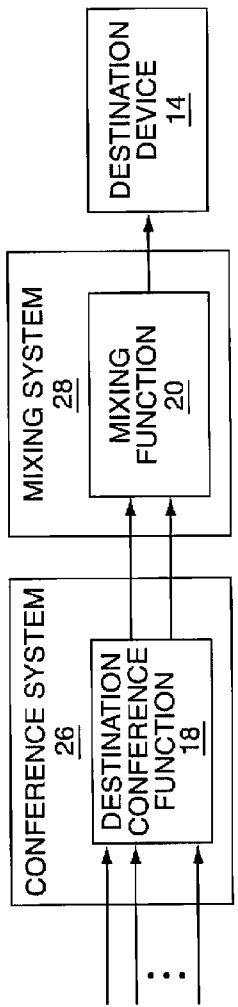
Figure 6C:
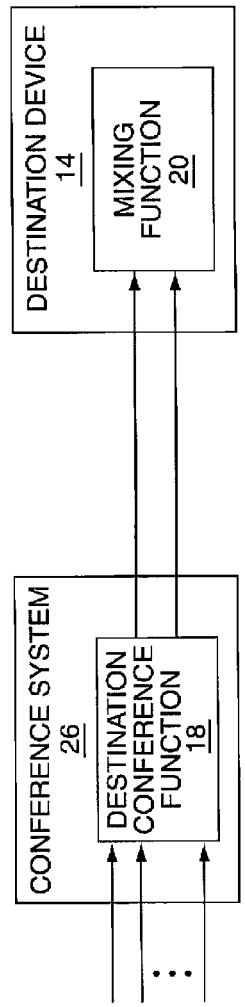
Figure 6D:
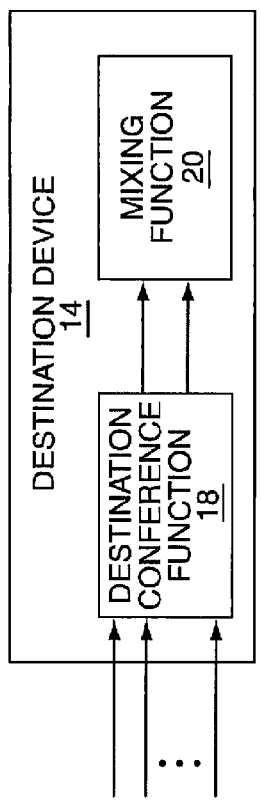
Figure 6E:
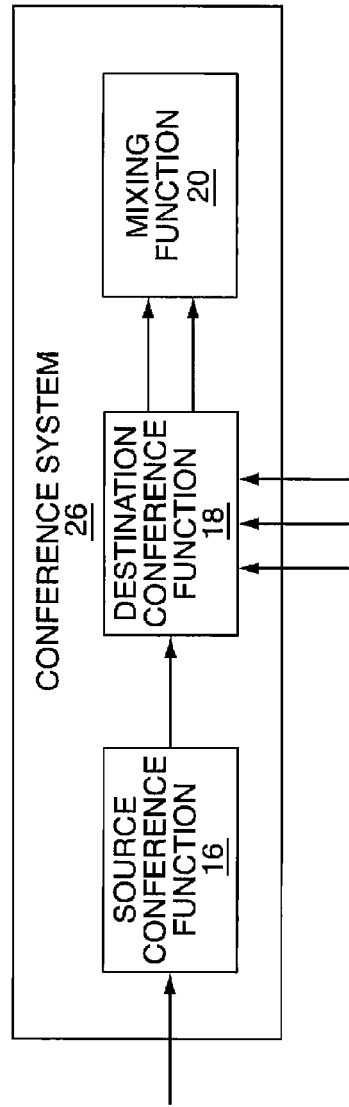

Given the logical nature of the functionality of the present invention, the various functions may be implemented in various ways and at various locations. Select variations are provided in FIGS. 6A-6E; however, these examples are only a few of the possible variations of implementing the present invention. With particular reference to FIG. 6A, the destination conference function 18 and the mixing function 20 may be provided in the conference system 26. In FIG. 6B, the destination conference function 18 is provided in the conference system 26, while the mixing function 20 is provided in a separate mixing system 28. In FIG. 6C, the destination conference function 18 is implemented in the conference system 26, and the mixing function 20 is implemented in the destination device 14. In FIG. 6D, the destination conference function 18 and the mixing function 20 are implemented in the destination device 14. As illustrated in FIG. 6E, the conference system 26 may support any number of source conference functions 16, destination conference functions 18, and mixing functions 20.

The present invention is particularly applicable in conferencing environments requiring voice or audio-based conferencing components. As such, basic voice conferencing and multimedia conferencing requiring voice conferencing benefit from the present invention. When the multimedia conferencing includes video conferencing or application sharing along with voice conferencing, video or application content to present to conference participants may be selected based on the audio content chosen to present to the conference participants. Alternatively, triggers provided in the control information may be used to select one or more video streams as an active video stream. Depending on how the control information is configured, different participants may receive different video streams. For voice conferencing, additional audio content may be mixed with the active media streams to provide a more rich conference experience.

Figures 7, 8:
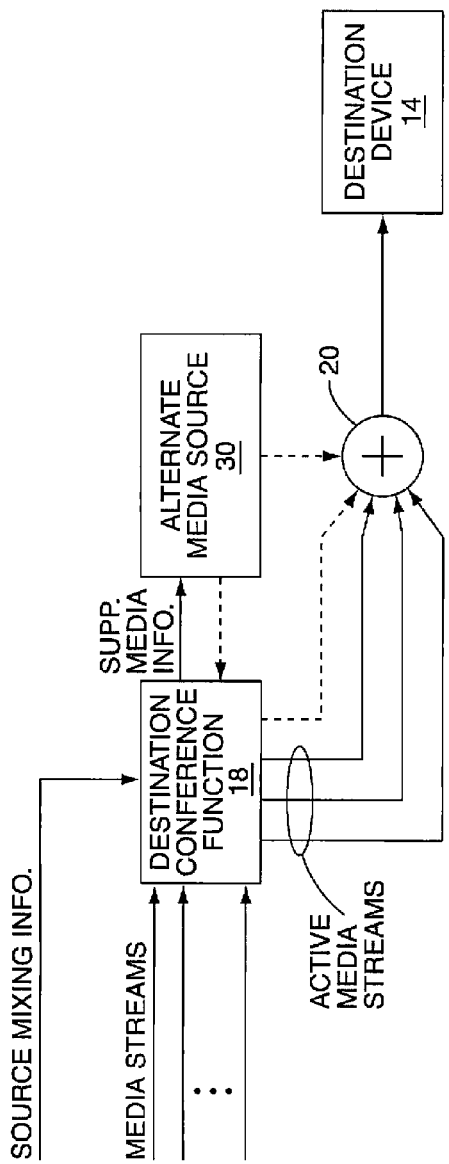
FIG. 7 is a logical representation of a conference environment including an alternate media source according to one embodiment of the present invention.
FIG. 8 is an example of a table that may be maintained at the source or destination conference functions to keep track of the participants associated with each conference according to one embodiment of the present invention.

As illustrated in FIG. 7, an alternate media source 30, such as a gaming console, content server, or the like, is able to provide additional media content, such as audio, graphics, video, or the like. The additional media content may be provided directly to the mixing function 20, or may be passed through the destination conference function 18 and then sent to the mixing function 20 along with the active media streams to create the destination stream, which is sent to the destination device 14. The dashed lines represent the various paths from the alternate media source 30 to the mixing function 20 for the additional media content. The destination conference function 18 may facilitate such operation based on control information maintained at the destination conference function 18, source mixing information received from the source conference functions 16, or from the control node 24. Those skilled in the art will recognize variations in allowing the destination conference function 18 to effectively control what additional media content is mixed with the active media streams, and how the additional media content is processed for mixing.

Since the present invention allows a single participant to engage in different conferences, which may include the same or different participants, the source conference function 16, destination conference function 18, or both may need to keep track of the participants associated with each conference. In particular, the source and destination conference functions 16, 18 may keep track of the respective source and destination conference functions 16, 18 associated with the respective participants. A table, such as that illustrated in FIG. 8, may be maintained at the source or destination conference functions 16, 18 as well as the control node 24. As illustrated, three conferences, X, Y, and Z, are provided. Conference X is a conference involving each of participants A-E, while Conference Y only includes participants A and B, and Conference Z only includes participants C, D, and E. In such a scenario, media content for Conference Y is only exchanged between participants A and B. Media content for Conference Z is only exchanged among participants C, D, and E. Media content for Conference X is exchanged among all of the participants A-E. The control information may be used to determine when media content from a particular participant should be associated with the respective conferences. This may become important because the media content from any given source device 12 is the same, in most scenarios.

The invention is also particularly applicable to virtual conferencing environments, including multiplayer gaming environments. For a given game, simultaneous conferences may be established where each conference includes a different collection of participants. For example, all of the gaming participants may be associated with one conference and separate teams formed from different groups of gaming participants are associated with additional conferences. In this example, participants on the same team may be able to hear each other regardless of their locations, whereas participants on opposing teams may only hear each other based on their relative proximity to one another, direction they are facing, gaming situation, gaming audio, and the like. Control information and additional audio may be provided to the source or destination conference functions 16, 18 to control what each participant can hear and how they should hear it in light of the different conferences and in-game environment. The video or graphics position, angle, or the like may be controlled in a similar way. As such, each participant receives a unique conference and gaming experience, which may entail receiving media content from multiple conferences at the same time.

Figure 9:
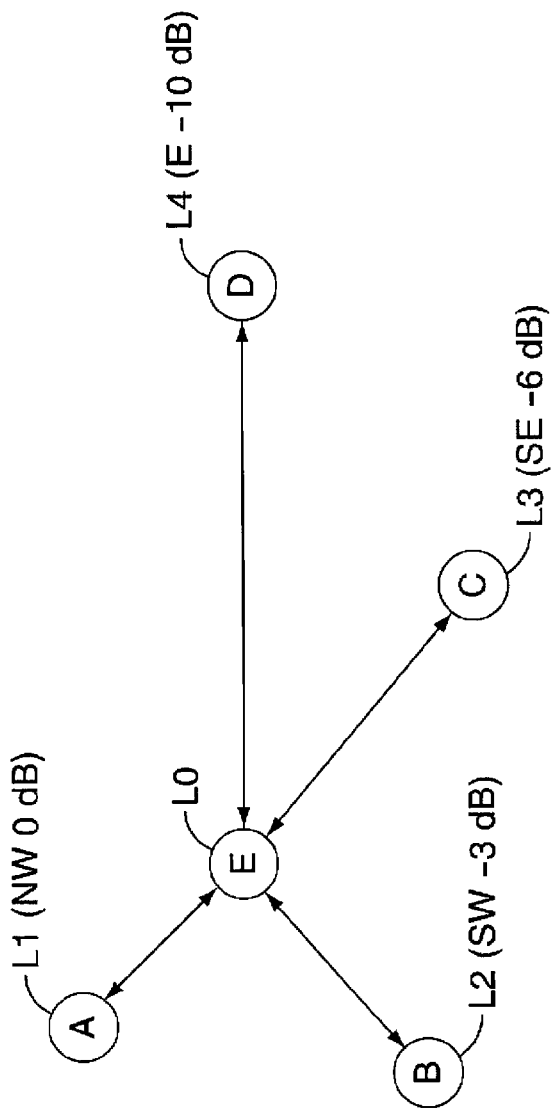
FIG. 9 is a logical representation of a virtual conference environment according to one embodiment of the present invention.

Turning now to FIG. 9, a virtual conference environment is illustrated as having five participants, A-E, located at five locations, L0-L4, respectively. Assuming the virtual conference environment is illustrated from the perspective of participant E, who is located at location L0, audio content provided to participant E from participants A-D may be handled differently depending on the type of conference environment. Regardless of the type of conference environment, assume that participant A is located to the northwest of participant E at location L1. Participant A is sufficiently close to participant E such that there is no natural attenuation of participant A's audio from the perspective of participant E. Participant B is located to the southwest of participant E, at location L2. The distance between participant B and participant E is sufficient that audio from participant B is attenuated −3 dB with respect to participant E. Participant C is located to the southeast of participant E, at location L3. The distance between participant C and participant E is sufficient that audio from participant C is attenuated −6 dB with respect to participant E. Participant D is located to the east of participant E, at location L4. The distance between participant D and participant E is sufficient that audio from participant D is attenuated −10 dB with respect to participant E.

Based on the above, in a traditional conference environment, the audio content presented to participant E from participants A-D may be processed to amplify the different audio content such that participant E receives the same relative volume level from the respective participants A-D. As such, the audio content from participant A is provided to participant E at a nominal volume level. The volume level for the audio content from participant B is increased by 3 dB, the volume level of audio content from participant C is increased by 6 dB, and the volume level for the audio content from participant D is increased by 10 db.

In an alternative conference environment, such as a gaming environment, the respective participants may be able to talk to one another, assuming they are participating in one or more conferences. Although the different players may be talking at roughly the same level, their virtual voice levels may be decreased based on the distance between the participants. With the example provided in FIG. 9, the volume level associated with the audio content from participant A is not decreased; however, the volume level for the audio content from participants B, C, and D is reduced by −3 dB, −6 dB, and −10 dB, respectively. As such, audio content provided to participant E from the other participants A-D is processed based on the relative distance the respective participants are from each other. Further processing may be provided to take into consideration the direction each of the participants is facing with respect to one another, background noises associated with their virtual locations, and the like. The audio content from the respective participants may be encoded for surround sound, such that a given participant may be able to automatically determine whether another participant is in front of them, behind them, or beside them, based on how the audio content is encoded and presented to that particular participant.

With reference to FIGS. 8 and 9, an example of how the various participants may be arranged in conference within a gaming environment is provided. Initially, assume that all of the participants are associated with Conference X. Participants A and B are associated with Conference Y, and participants C-E are associated with Conference Z. As such, participants A and B may be on a first team, and participants C-E may be on a second team. In a first person shooter type game, participants A and B on the first team may have in-game communication headsets that allow them to talk to one another regardless of their respective positions. The respective source and destination conference functions 16, 18 for the various participants will cooperate to allow participants A and B to always communicate with each other regardless of location, as well as allow participants C-E to always communicate with each other regardless of position. Participants on opposing teams are only able to communicate with one another if they are within a given proximity of one another.

As such, Conferences Y and Z always facilitate intra-conference communications, whereas Conference X facilitates inter-conference communications. Conferences Y and Z always allow the team members to communicate with one another, whereas Conference X is established such that only select members from either team are available to communicate with each other depending on their relative proximity. Thus, if participant B and participant C are within a given proximity of one another, but no other participants are close to participants B and C, only participants B and C can communicate with one another over Conference X. Although the conferences are always active, the various control information is employed to only select the media content for participants B and C for exchange in the above situation. The media content provided by participants A, D, and E are not selected, and thus are not exchanged over Conference X in this example.

In this example, participant B may be able to receive media content from participant C via Conference X, and from participant A via Conference Y. Since the destination conference function 18 is receiving media content from all participants, in light of conferences X, Y, and Z, the various media content from the different conferences may be selected as appropriate and mixed together to form a single destination stream to present to the corresponding destination device 14 of participant B. This is the case because participant B should be able to hear participant C due to their proximity, and participant A due to their in-game communication equipment. To further the example, supplemental audio content may be selected based on the relative locations of participants B and C and mixed into the destination stream, such that participant B is able to hear participant A, participant C, and the appropriate background sounds in light of her location. Since these conferences are controllable on an individual basis by all of the participants, each participant can give precedence to herself or to others within the respective conferences. If a team leader is talking, all the other team members may receive the team leader's comments even if all the team members are talking at the same time. Within any given conference setting, the number of incoming media streams to mix into a destination stream may be limited to a select number, where certain media streams are given priority over others. In normal operation, the media streams having the highest relative volume levels may be selected for the destination stream, unless the team leader is speaking. Those skilled in the art will recognize the tremendous flexibility in arranging conferences as well as the significant utility imparted by the invention.

With reference to FIG. 10, an exemplary table is provided to illustrate how certain control information may be provided at a destination conference function 18 for participant E, who is located at location L0. In this example, the conference table identifies the source conference functions 16 for participants A-D, their relative priorities in general or at any given time, orientation information, and any supplemental media information. The orientation information may include the actual or relative locations L1-L4, as well as their positions and influence on audio levels. The supplemental media information may identify additional media content to mix into the destination stream to provide sound effects and the like. Additional processing information may be provided to not only identify what background audio to provide, but a relative level at which to provide the background audio content. Similar tables could be provided at the source conference function 16.

Notably, the present invention is particularly applicable in audio or voice-based conferencing, but is readily applicable to other types of media, such as text, video, and graphics, or any combination thereof. As such, the conferences may be established for any single type of media content or a combination of different types of media content. The different types of media content may be integrated into a common media stream or provided in parallel media streams. Those skilled in the art will recognize numerous ways for conference participants to configure their respective source and destination conference functions 16, 18 to customize their conference experience on a participant-by-participant basis. Additionally, the present invention is equally applicable to voice only conferences, which are those that only include voice.

Figure 11:
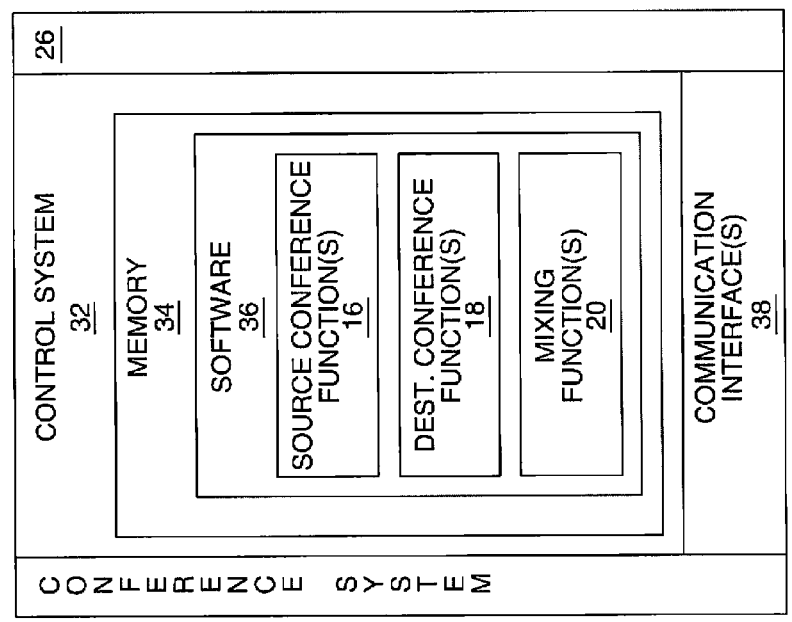
FIG. 11 is a block representation of a conference system according to one embodiment of the present invention.

FIG. 11 is a block representation of a conference system 26. The conference system 26 may include a control system 32 having sufficient memory 34 for the requisite software 36 to operate as described above. Depending on how the conference system 26 is configured, the software 36 may support any number of source conference functions 16, destination conference functions 18, and mixing functions 20. Notably, the conference system 26 may only allocate mixing functions 20 for those destination devices that do not include internal mixing functions 20 or are associated with some other mixing function 20. As such, the conference system 26 may provide mixing functions 20 internally for select destination devices 14, and not for others. The control system 32 may also be associated with one or more communication interfaces 38 to facilitate communications with various entities using packet-based communications.

Figure 12:
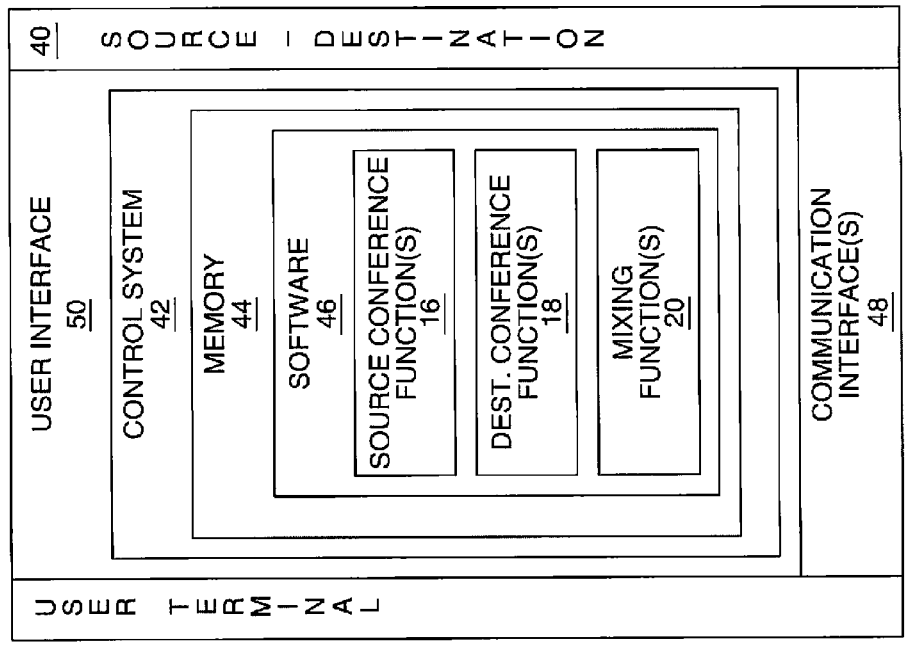
FIG. 12 is a block representation of a user terminal according to one embodiment of the present invention.

FIG. 12 illustrates a user terminal 40, which may represent a source device 12 and a destination device 14, alone or in combination. The user terminal 40 will include a control system 42 with sufficient memory 44 for the requisite software 46 to operate as described above. In particular, the software 46 may include source conference functions 16, destination conference functions 18, as well as mixing functions 20 in select embodiments. All of these functions are not necessarily implemented in each user terminal 40, but may be selectively and individually employed in any given user terminal 40. The control system 42 may be associated with one or more communication interfaces 48 to facilitate packet-based communications with various entities. The control system 42 may also be associated with a user interface 50, which facilitates presentation of various media to a user, and facilitates the reception of media and other control information from the user.

Figure 13:
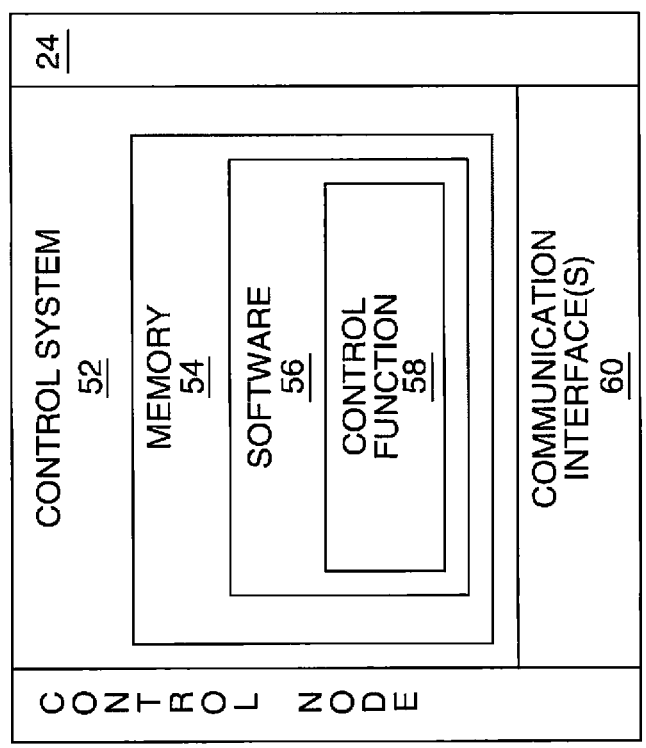
FIG. 13 is a block representation of a control node according to one embodiment of the present invention.

FIG. 13 provides a block representation of a control node 24 according to one embodiment of the present invention. The control node 24 will include a control system 52 having sufficient memory 54 for the software 56 necessary to operate as described above. The software 56 may provide an overall control function 58 to facilitate control of any number of source conference functions 16, destination conference functions 18, mixing functions 20, or the like. The control system 52 is also associated with one or more communication interfaces 60 to facilitate packet-based communications with various entities.

Those skilled in the art will recognize improvements and modifications to the preferred embodiments of the present invention. All such improvements and modifications are considered within the scope of the concepts disclosed herein and the claims that follow.

What is claimed is:

1. A method of providing a source conference function in a conference environment comprising source and destination conference functions, the method comprising:
selecting at least one destination conference function for a conference, wherein each destination conference function is associated with a media destination;
receiving first media content from a first media source;
generating control information for the first media content;
sending the first media content to the at least one destination conference function;
sending the control information to the at least one destination conference function, wherein each destination conference function is adapted to receive and select at least one of the first media content and media content from at least one other source conference function to use for generating destination media content for delivery to the media destination for the conference based on the control information such that each destination conference function generates different destination media content, where the generated destination media content includes the first media content and the media content from the at least one other source conference function.

2. The method of claim 1 wherein the at least one destination conference function comprises a plurality of destination conference functions provided in a conference system, and the first media content is sent to each of the plurality of destination conference functions.

3. The method of claim 1 wherein a plurality of destination conference functions is provided by a conference system and the first media content is sent to the conference system in a single multicast stream, wherein the conference system is adapted to provide the media content provided in the single multicast stream to the plurality of destination conference functions.

4. The method of claim 1 wherein the selecting at least one destination conference function for the conference comprises selecting at least one destination conference function for each of a plurality of conferences, wherein the first media content is sent to the at least one destination conference function for each of the plurality of conferences.

5. The method of claim 4 wherein a first destination conference function for a first conference of the plurality of conferences is not a destination conference function for a second conference of the plurality of conferences.

6. The method of claim 4 wherein a first destination conference function for a first conference of the plurality of conferences is a destination conference function for a second conference of the plurality of conferences.

7. The method of claim 1 wherein the sending the control information to the at least one destination conference function comprises placing the control information into packets within a content stream carrying the first media content to the at least one destination conference function.

8. The method of claim 1 wherein sending the control information to the at least one destination conference function comprises sending a message outside of a content stream carrying the first media content to the at least one destination conference function.

9. The method of claim 1 wherein the control information bears on at least one of a group consisting of priority information, orientation information, and supplemental media information.

10. The method of claim 1 wherein the conference is an audio conference and the first media content, the media content from the at least one other source conference function, and the destination media content are audio content of a group consisting of non-voice audio content and voice content.

11. The method of claim 1 wherein the first media content, the media content from the at least other source conference function, and the destination media content are streaming content.

12. A method of providing a destination conference function in a conference environment comprising source conference functions associated with media sources and a plurality of destination conference functions associated with media destinations, the method comprising:
receiving media content from a first plurality of the source conference functions for a first conference, wherein each source conference function is associated with a media source;
obtaining control information associated with the media content selected from the first plurality of the source conference functions; and
selecting and mixing media content received from the first plurality of the source conference functions for the first conference, the selecting and mixing being based on the control information to generate destination media content for delivery to a first media destination for the first conference, the first conference having a plurality of media destinations, wherein each of the plurality of media destinations is associated with a destination conference function and each destination conference function generates different destination media content.

13. The method of claim 12 wherein the plurality of destination conference functions is provided by a conference system and the media content from one of the source conference functions is received via a single multicast stream, wherein the conference system is adapted to provide the media content received in the single multicast stream to the plurality of destination conference functions.

14. The method of claim 12 further comprising:
receiving media content from a second plurality of the source conference functions for a second conference; and
selecting media content received from at least one of the second plurality of the source conference functions for the second conference to generate the destination media content for delivery to the first media destination.

15. The method of claim 14 wherein the destination media content for delivery to the first media destination comprises media content from the first plurality of the source conference functions and the at least one of the second plurality of the source conference functions.

16. The method of claim 14 wherein a first destination conference function for the first conference is not a destination conference function for the second conference.

17. The method of claim 14 wherein a first destination conference function for the first conference is a destination conference function for the second conference.

18. The method of claim 12 wherein the obtaining the control information comprises analyzing the media content received from the first plurality of the source conference functions to determine the control information.

19. The method of claim 12 wherein the obtaining the control information comprises recovering the control information from packets within content streams carrying the media content from the first plurality of the source conference functions.

20. The method of claim 19 wherein the control information is separate from the media content.

21. The method of claim 12 wherein the obtaining the control information comprises receiving control information separate from content streams carrying the media content from the first plurality of the source conference functions.

22. The method of claim 12 wherein the control information bears on at least one of a group consisting of priority information, orientation information, and supplemental media information.

23. The method of claim 12 wherein the control information is provided from an entity other than the first plurality of the source conference function.

24. The method of claim 12 wherein the first conference is an audio conference and the media content from the first plurality of the source conference functions and the destination media content are audio content of a group consisting of non-voice-audio content and voice content.

25. The method of claim 12 wherein the media content from the first plurality of the source conference function and the destination media content are streaming content.

26. The method of claim 12 further comprising mixing media content selected from the media content received from the first plurality of the source conference functions to generate the destination media content.

27. The method of claim 15 further comprising effecting delivery of the destination media content to the first media destination.

* * * * *

UNITED STATES PATENT AND TRADEMARK OFFICE
CERTIFICATE OF CORRECTION

| | |
|---|---|
| PATENT NO. | : 8,660,040 B1 |
| APPLICATION NO. | : 11/616701 |
| DATED | : February 25, 2014 |
| INVENTOR(S) | : Philip Edholm |

It is certified that error appears in the above-identified patent and that said Letters Patent is hereby corrected as shown below:

In the Claims:

In column 17, claim 27, at line 26, replace "15" with --12--.

Signed and Sealed this
Twentieth Day of May, 2014

Michelle K. Lee
*Deputy Director of the United States Patent and Trademark Office*